(12) United States Patent
Levin et al.

(10) Patent No.: US 9,187,097 B2
(45) Date of Patent: Nov. 17, 2015

(54) METHOD AND APPARATUS FOR SPEED ESTIMATION AND CONTROL

(75) Inventors: Daniel Levin, Goeteborg (SE); Johan Roennberg, Goeteborg (SE)

(73) Assignee: Volvo Car Corporation, Gothenburg (SE)

(*) Notice: Subject to any disclaimer, the term of this patent is extended or adjusted under 35 U.S.C. 154(b) by 522 days.

(21) Appl. No.: 13/527,165

(22) Filed: Jun. 19, 2012

(65) Prior Publication Data
US 2012/0326856 A1 Dec. 27, 2012

(30) Foreign Application Priority Data
Jun. 22, 2011 (EP) ..................................... 11170874

(51) Int. Cl.
*B60Q 1/00* (2006.01)
*B60W 30/18* (2012.01)
*B60W 50/00* (2006.01)
*B60W 50/14* (2012.01)
B60W 30/14 (2006.01)

(52) U.S. Cl.
CPC ..... *B60W 30/18145* (2013.01); *B60W 50/0097* (2013.01); *B60W 50/14* (2013.01); *B60W 30/146* (2013.01); *B60W 2050/143* (2013.01); *B60W 2520/105* (2013.01); *B60W 2520/125* (2013.01); *B60W 2540/30* (2013.01); *B60W 2550/12* (2013.01); *B60W 2550/142* (2013.01); *B60W 2550/146* (2013.01); *B60W 2550/148* (2013.01); *B60W 2550/402* (2013.01); *B60W 2720/10* (2013.01); *B60W 2720/103* (2013.01); *Y02T 10/84* (2013.01)

(58) Field of Classification Search
CPC ................. B60W 2550/142; B60W 2550/143; B60W 2720/103; B60W 30/045; B60W 30/146; B60W 40/072; B60W 2520/105; B60W 2520/125; B60W 2520/30; B60W 2550/12; B60W 2550/146; B60W 2550/148; B60W 2720/10; B60W 40/105; G08G 1/16
USPC ......... 340/437, 438, 436, 435, 441, 439, 988, 340/447; 701/300, 301, 70, 71, 72, 73
See application file for complete search history.

(56) References Cited

U.S. PATENT DOCUMENTS

| | | | |
|---|---|---|---|
| 7,400,963 B2* | 7/2008 | Lee et al. | 701/93 |
| 2007/0008090 A1 | 1/2007 | Gertsch et al. | |
| 2011/0205045 A1* | 8/2011 | Pilutti et al. | 340/441 |
| 2011/0301802 A1* | 12/2011 | Rupp et al. | 701/29 |

FOREIGN PATENT DOCUMENTS

DE 10242124 A1 3/2004

OTHER PUBLICATIONS

European Patent Office, Extended Search Report for corresponding European Patent Application No. 11170874.9 mailed Nov. 14, 2011.

* cited by examiner

*Primary Examiner* — Kerri McNally
(74) *Attorney, Agent, or Firm* — Brooks Kushman P.C.

(57) ABSTRACT

A system and method for determining a speed profile for a vehicle travelling along a road in which a curve speed estimation unit receives inputs indicating a position of the vehicle relative to a curve ahead of the vehicle, and inputs related to vehicle velocity, curve geometry, road surface conditions, vehicle-specific data; and driver preferences. The curve sped estimation unit use at least some of the above-listed inputs to determine a speed profile for the curve by generating an acceleration limit map which depends on a relationship between a maximum possible longitudinal acceleration and a maximum possible lateral acceleration.

18 Claims, 6 Drawing Sheets

METHOD AND APPARATUS FOR SPEED ESTIMATION AND CONTROL

CROSS-REFERENCE TO RELATED APPLICATIONS

This application claims foreign priority benefits under 35 U.S.C. §119(a)-(d) to EP 11170874.9, filed Jun. 22, 2011, the disclosure of which is hereby incorporated by reference in its entirety.

TECHNICAL FIELD

The present invention relates to Curve Speed Estimation and Warning systems, and to method for generating a desired or allowable speed profile for use in such systems.

BACKGROUND

To help vehicle drivers lower their speed before reaching critical road passages like curves or congested areas, Curve Speed Warning (CSW) systems have been developed. Such systems alert the driver by providing warnings (audible, visible, haptic, etc.) to make the driver aware that the vehicle speed may be too high for a safe and/or comfortable negotiation of the upcoming curve. Such systems may, for example, compare the predicted or projected speed of the vehicle with a predetermined maximum limit when it approaches a known or expected traffic environment (an area of congested traffic, for example) requiring low speed in order to be managed safety. If the speed is above the limit, the system warns the driver. Also known are so-called Curve Speed Control (CSC) systems which autonomously lower the speed of a vehicle before a curve or any other known traffic environment requiring lower speed.

U.S. Pat. No. 7,400,963 B2 discloses a vehicle curve speed control system that includes a map database representing a current vehicle path and a locator device communicatively coupled to the database and configured to determine the location of the vehicle on the path. The system further includes a controller configured to identify approaching curve points of a curve in terms of curvature or radius, and determine a desired speed profile based on driver preference and/or vehicle characteristic input. An acceleration profile is determined, based on the current vehicle speed, and desired speed profile. An acceleration or deceleration command at the present control loop is modified towards achieving an optimal curve speed and is delivered to either a brake or an acceleration module to automatically accelerate or decelerate the vehicle accordingly.

A natural limit for a vehicle's acceleration and deceleration is established by the friction available between the vehicle's tires and surface of the road on which it is travelling. Systems as described above take into account a maximum possible acceleration in either the longitudinal direction (which may be caused by braking or adding power) or the lateral direction (which may be caused by centripetal force), but fail to take a combination thereof into account. If, for example, a driver brakes at the same time as steering through a small-radius curve, the lateral acceleration limit may not be reached, but due to the longitudinal acceleration caused by braking the combined lateral/longitudinal limit may be exceeded, with the result that the tires may lose grip with the road.

SUMMARY

In a first disclosed embodiment, a method for determining a speed profile for a vehicle travelling on a road comprises identifying a curve that is being approached by the vehicle, and determining the speed profile for the curve by generating an acceleration limit map which depends on a relationship between a maximum possible longitudinal acceleration and a maximum possible lateral acceleration. By taking the relationship between the lateral and longitudinal accelerations into account when calculating the acceleration limit map, the speed profile will be more optimised and safer, since the acceleration limit map and thus the speed profile reflects true situations more accurately than would otherwise be possible.

In another embodiment, the method further comprises the step of warning the driver if the projected vehicle speed exceeds the speed profile. In this case, the warning is preferably issued prior to the event that the projected speed exceeds the speed profile, in order to provide the driver time to react and lower the vehicle speed.

According to another embodiment, a system for determining a speed profile for a vehicle travelling along a road comprising a curve speed estimation unit operative to receive inputs indicating a position of the vehicle relative to a curve ahead of the vehicle, and inputs related to vehicle velocity, curve geometry, road surface conditions, vehicle-specific data; and driver preferences. The curve sped estimation unit use at least some of the above-listed inputs to determine a desired speed profile for the curve by generating an acceleration limit map which depends on a relationship between a maximum possible longitudinal acceleration and a maximum possible lateral acceleration.

In another disclosed embodiment, a method for determining a speed profile for a road curve being approached by a vehicle comprises identifying physical characteristics of the road, identifying vehicle-specific data related to an ability of the vehicle to negotiate the curve, and determining the speed profile for the curve by generating an acceleration limit map, the map generated by considering a relationship between a maximum possible longitudinal acceleration and a maximum possible lateral acceleration.

Further features of, and advantages with, the present invention will become apparent when studying the appended claims and the following detailed description. Those skilled in the art will realize that different features of the present invention may be combined to create embodiments other than those described in the following, without departing from the scope of the present invention, as defined by the appended claims.

BRIEF DESCRIPTION OF THE DRAWINGS

Embodiments of the present invention described herein are recited with particularity in the appended claims. However, other features will become more apparent, and the embodiments may be best understood by referring to the following detailed description in conjunction with the accompanying drawings, in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
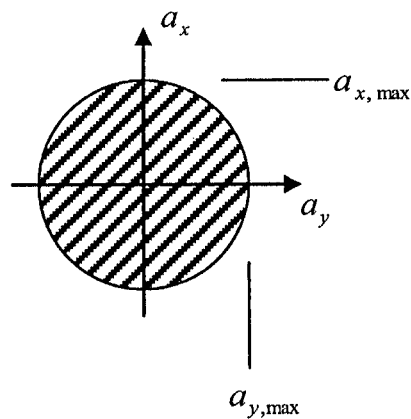
FIG. 1 illustrates a friction circle representing maximum possible acceleration due to available friction in both x and y directions.

FIG. 1 shows a friction circle, showing the maximum acceleration achievable by a vehicle due to available friction in both the x- and y- (or lateral and longitudinal) directions. This friction-limited maximum achievable acceleration is commonly known as the acceleration limit. The shape as a circle is an idealized situation where it is assumed that exactly the same maximum acceleration might be achieved in any direction, longitudinal, lateral or any combination thereof. In reality, the relationship between longitudinal and lateral directions is likely to be more complicated, as is well known in the art.

Maximum available friction between the tires and the road is given by available road friction µ, and the gravitational constant g, as µ*g. Many other parameters affect the friction available, such as outside temperature, road surface material and air moisture content, and road surface structure/condition. As may be seen from the figure, friction available may be used for acceleration, or deceleration, in longitudinal direction, in lateral direction or a combination thereof. If the vehicle/tire acceleration in any direction exceeds the circle, the vehicle will lose grip with some degree of loss-of-control as a consequence.

Figure 2:
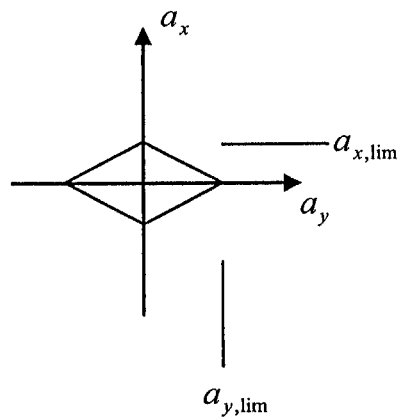
FIG. 2 shows one example of lateral ($a_y$) and longitudinal ($a_x$) accelerations relationship for a Curve Speed Estimator (CSE) system.

FIG. 2 shows an acceleration limit map that exhibits one example of lateral ($a_y$) and longitudinal ($a_x$) accelerations relationship for a Curve Speed Estimator (CSE) system. A CSE calculates at least one speed profile for each path through a curve. A speed profile may correspond to a maximum possible or allowable speed profile as dictated by the acceleration limit beyond which the tires lose grip with the road. A speed profile may also be a desired speed profile set at a speed lower than the allowable speed profile. A desired speed profile may correspond to a "comfort" speed profile. Other possible desired speed profiles may be a "safety" speed profile, an "economy" speed profile, or a "sport" or "performance" speed profile, as set or selected by the driver or other decision maker. Information about the current static and dynamic environment around and ahead of the current vehicle position together with map data is used to calculate the speed profiles. Limitations in the desired speed profiles are set by lateral and longitudinal dynamic acceleration limit maps.

The accelerations in longitudinal and lateral directions depend on each other and limitations in the speed are set by the lateral and longitudinal accelerations. The accelerations depend on each other as mentioned above. The relation between the speed and the two accelerations may be expressed as:

$a_{y,i} = v_i^2 C_i$ for the lateral acceleration, and $$a_{x,i} = \frac{v_{i+1} - v_i}{\Delta T_i}$$

for the longitudinal acceleration;
where
$v_i$ is the vehicle speed in sample point i,
$v_{i+1}$ is the vehicle speed in the next sample point i+1,
$C_i$ is the curvature in sample point i of a curve defined as the inverse of the curve radius, and
$\Delta T_i$ is the time between two samples.

The relation between lateral and longitudinal accelerations, i.e. the acceleration limit map, may change due to e.g. road friction, driving style or vehicle state. Some vehicle configuration and type may e.g. allow higher acceleration while driving in a curve. The relation may even depend on whether a left- or right-turn is being made.

For maximum comfort and safety, the aim is to have low or zero longitudinal acceleration at points on the path where the radius-of-curvature is the smallest. In the specific example shown, the acceleration limits are symmetric in the x and y directions respectively. The limitations on the lateral and longitudinal accelerations also depend on the vehicle speed, since most drivers tend to more strictly avoid lateral acceleration at higher speeds.

Figure 3:
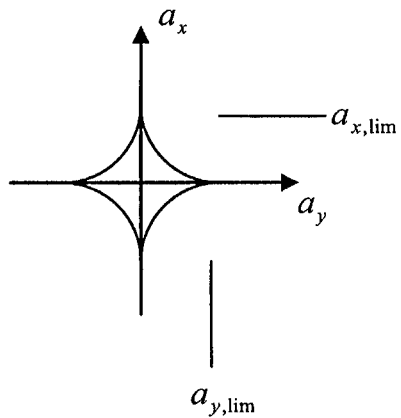
FIG. 3 shows a further example of lateral ($a_y$) and longitudinal ($a_x$) accelerations relationship.

FIG. 3 shows a further example of an acceleration limit map with lateral ($a_y$) and longitudinal ($a_x$) accelerations relationship. In this example, the x and y acceleration limits are not linearly dependent on each other. A non-linear relationship is more likely to be more accurate, since available tire grip depends non-linearly on the longitudinal and lateral accelerations. Further, due to both comfort and safety reasons, lateral acceleration limits may be set at a different value than longitudinal acceleration limits. The more aggressive driving style, the larger the area inside the acceleration limit map will become. A acceleration limit map for a comfort or economy driving style will result in a smaller area inside the acceleration limit map and end up well inside the friction circle, thus ensuring available grip.

Figure 4:
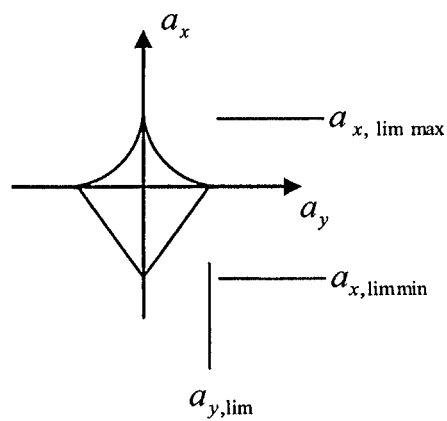
FIG. 4 shows an example of a general lateral ($a_y$) and longitudinal ($a_x$) accelerations relationship.

FIG. 4 shows yet another example of an acceleration limit map. In this example, the allowed lateral accelerations while accelerating do not depend on the longitudinal acceleration in the same way as when decelerating.

Figure 5:
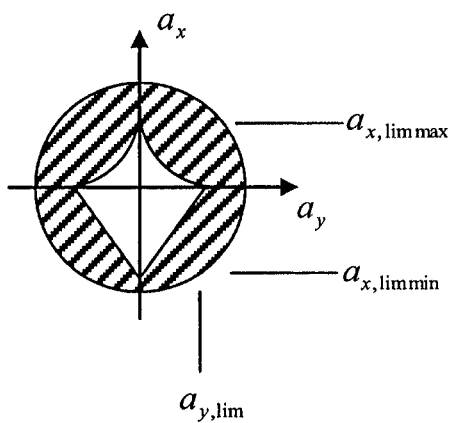
FIG. 5 shows an example of a general lateral ($a_y$) and longitudinal ($a_x$) accelerations relationship, together with the maximum available friction shown as a friction circle. In the figure, the accelerations $a_y$ and $a_x$ have been normalized with the gravitational constant g.

FIG. 5 shows an example of an acceleration limit map overlaid on the friction circle. As seen from the figure, the acceleration limit map is well inside the friction circle.

Figure 6:
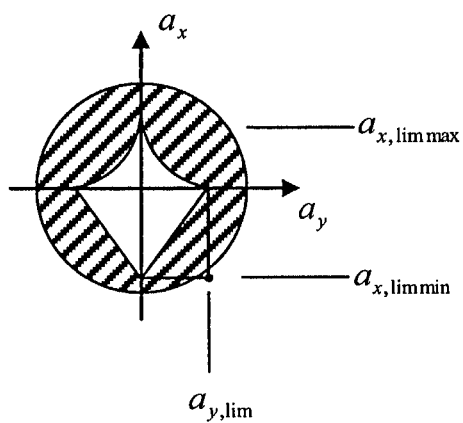
FIG. 6 shows that the acceleration will end up outside the friction circle, with lose of grip as a result, if both the lateral ($a_y$) and longitudinal ($a_x$) accelerations limits are reached simultaneously without taken into account the relationship between them. In the figure, the accelerations $a_y$ and $a_x$ have been normalized with the gravitational constant g.

FIG. 6 illustrates what would happen if the vehicle were to reach both the lateral and longitudinal acceleration limits simultaneously. The resultant combined acceleration would end up outside of the friction circle, showing that the combined acceleration is too high in relation to the available friction. A vehicle in such situation will lose grip and some degree of loss-of-control may be expected in result thereof. Therefore, it is important to take the relationship between the lateral and longitudinal acceleration into account when deciding the acceleration limits.

Figure 7:
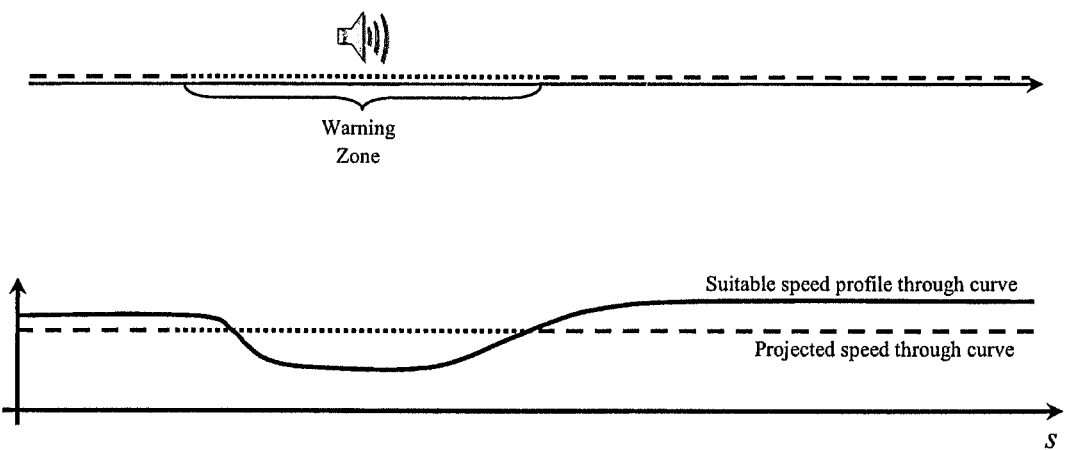
FIG. 7 illustrates the general principle of operation of a Curve Speed Warning (CSW) system using a Curve Speed Estimation (CSE) system.

FIG. 7 shows the general principle of a Curve Speed Warning (CSW) system using a Curve Speed Estimation (CSE) system. The CSW system projects the speed of the vehicle through an upcoming curve. The projection is based primarily upon the current (i.e. the time at which the projection is made) speed of the vehicle. As shown in the figure, if the vehicle does not reduce its speed, the projected speed of the vehicle when it reaches a warning zone will exceed the speed profile. The CSW system will then warn the driver accordingly. Preferably, a warning message and/or warning sound will continue as long as the vehicle speed is projected to exceed the desired speed profile. Note that the warning zone preferably starts prior to the point or event at which the projected vehicle speed exceeds the desired speed profile, in order to provide the driver time to react by lowering the vehicle speed before the vehicle reaches the point where its speed exceeds the desired speed profile.

Figure 8:
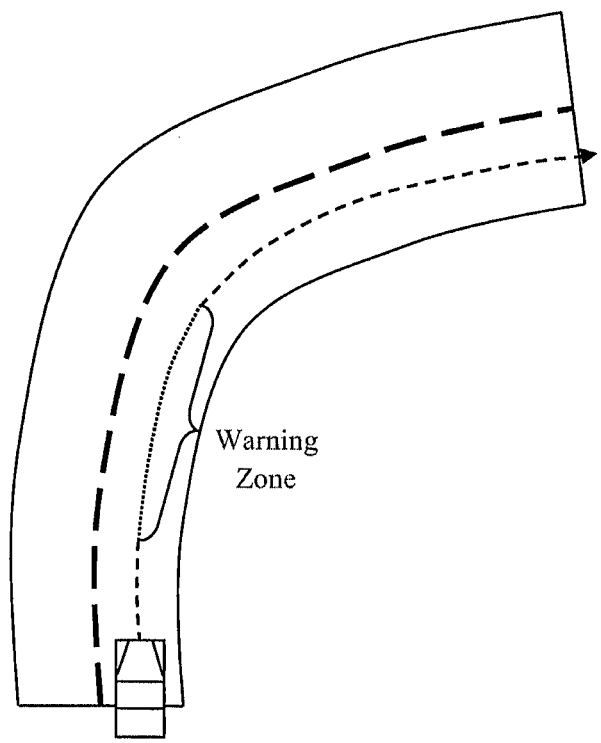
FIG. 8 shows a vehicle approaching a curve section for which a speed profile has been determined.

FIG. 8 shows a vehicle approaching a curve at a speed at which the CSE system determines that, at some point within the warning zone, the projected speed exceeds the desired speed profile and so the Curve Speed Warning system will warn accordingly. Warning will continue until the projected speed is below the desired speed profile.

Figure 9:
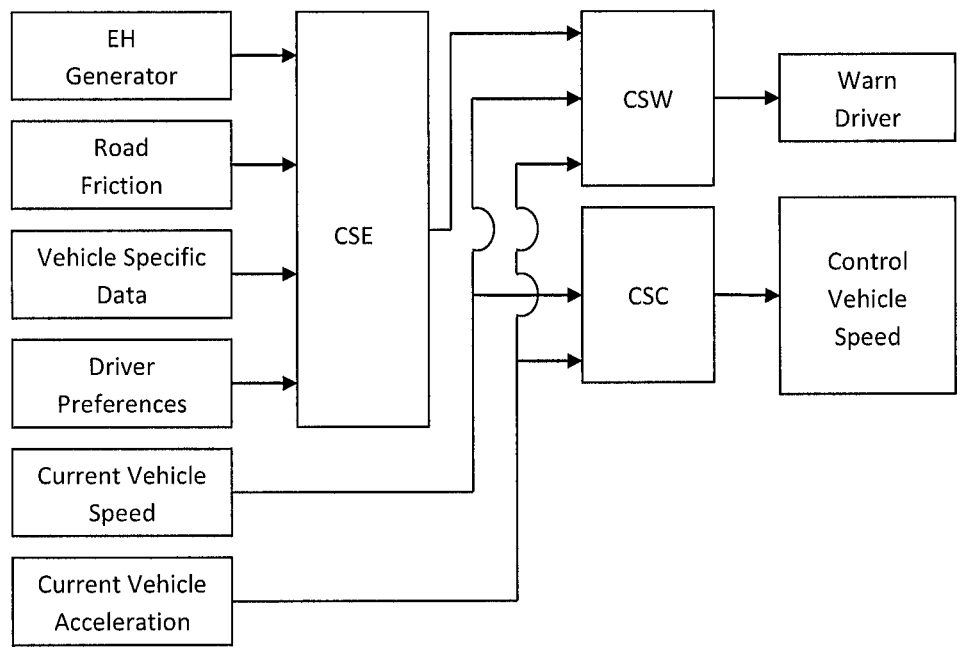
FIG. 9 is a block diagram showing one example of a Curve Speed Warning (CSW)/Curve Speed Control (CSC) system architecture.

FIG. 9 is a block diagram showing an example of Curve Speed Warning (CSW)/Curve Speed Control (CSC) system architecture. The Curve Speed Estimator (CSE) may use information from an Electronic Horizon (EH) using map data, data concerning road friction available, vehicle-specific data and parameters set by the driver for determining a desired speed profile. Dynamic information used to determine the desired speed profile may thus be road friction, and weather conditions. Static information like type of lane markings and signs along the road are also taken into account from map data. Vehicle-specific data that are pertinent to an ability of the vehicle to safely and/or comfortably negotiate a curve may include and/or be based upon parameters such as vehicle type, tire type and/or condition, center-of-mass affecting roll behavior, number of passengers affecting the load ratio, and the weight of the vehicle also affects the speed profile. The method may also take into consideration if a trailer is connected and the mass relation trailer/vehicle. The driving style with respect to curve handling may further be measured and taken into consideration. Such measurements may, for example, be the degree to which the driver brakes before curves, accelerates at curve exits, and/or cuts-off corners. The Curve Speed Warning (CSW) system and the Curve Speed Control (CSC) systems compare the estimated speed profile with a projected vehicle speed based on current vehicle speed and current vehicle acceleration, and warn the driver and/or control vehicle speed if appropriate.

Figure 10:
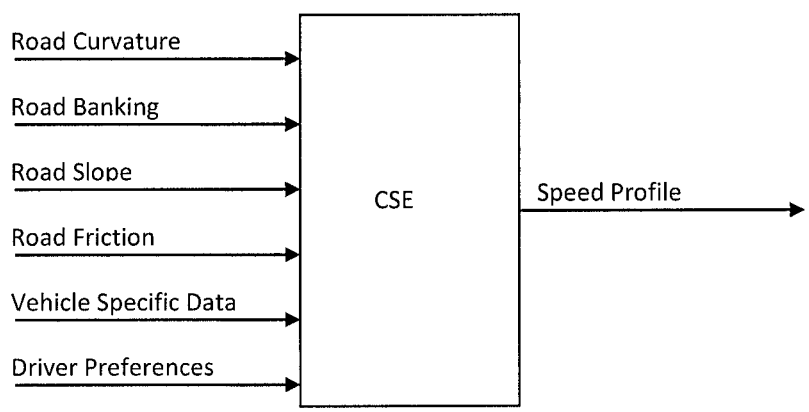
FIG. 10 shows boundary diagram for a Curve Speed Estimation (CSE) system.

FIG. 10 shows a boundary diagram for an example of a Curve Speed Estimation (CSE) system. From map data, information about the physical characteristics of the road such as radius of curvature, road bank angle, and road slope is achieved. Further, information about available road friction, vehicle-specific data and driver preferences is achieved. Based on this information, a speed profile is determined.

Figure 11:
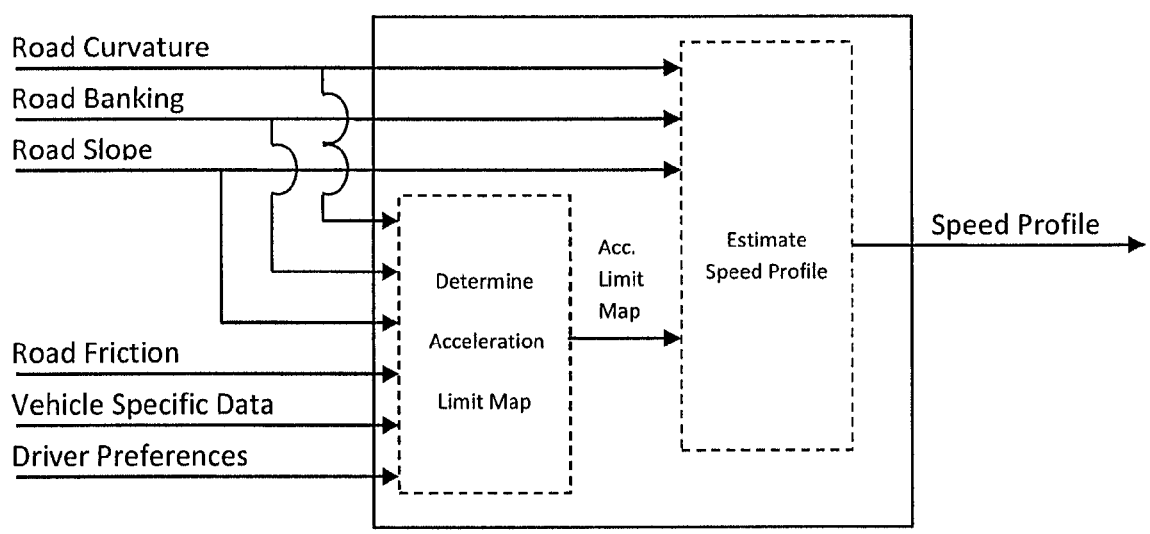
FIG. 11 shows boundary diagram for a Curve Speed Estimation (CSE) system utilizing an acceleration limit map.

FIG. 11 shows a boundary diagram for an example of a Curve Speed Estimation (CSE) system in accordance with an embodiment of the present invention. To determine a dynamic acceleration limit map, data relating to available road friction, the specific vehicle driven and preferences set by the driver are taken into account. The acceleration limit map is based on a relationship present between the acceleration in lateral and longitudinal directions as shown in FIGS. 2-5. The map is re-calculated continuously depending on changes in data affecting the acceleration limits.

Parameters used to determine the available road friction may for example be information regarding the physical characteristics such as the material and/or condition of the road surface, outside temperature, air moisture content, information from the Anti-Lock Brake System (ABS), Electronic Stability Control (ESC) system, and size of any vibrations from the wheels, provided by sensors in the vehicle. Further parameters are road surface finish that may depend on snow, ice, oil, gravel, or other materials being present on the road surface. Modern vehicles are provided with a number of sensors, cameras and the like and large amounts of information may be available. Vehicle-specific parameters might be vehicle type, tire type and/or condition, current load ratio and current centre-of-gravity location. Yet further information regarding road friction could be collected via wireless communication with other vehicles and/or traffic tracking/control/advisory infrastructure.

From the vehicle, information about center-of-gravity location, current load ratio, current speed and current acceleration in longitudinal direction as well as in lateral direction may be used.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of determining a speed profile for a vehicle travelling on a road comprising:
    identifying a curve of the road that is being approached by the vehicle; and
    determining the speed profile for the curve by generating an acceleration limit map, the map depending on a relationship between a maximum possible longitudinal acceleration and a maximum possible lateral acceleration for traversing the curve.

2. The method of claim 1, wherein the acceleration limit map is generated based on a parameter related to a driving style of a driver of the vehicle.

3. The method of claim 1, wherein the acceleration limit map is generated based on a parameter related to at least one of the following: available road friction and vehicle-specific data.

4. The method of claim 3, wherein the parameter relates to available road friction and is determined based upon at least one of: information received from an anti-lock brake system of the vehicle, information received from an electronic stability control system of the vehicle, outside temperature, air moisture content, road surface reflection, road surface finish, information received via wireless communication from other vehicles, and information received via wireless communication from surrounding infrastructure.

5. The method of claim 1, wherein the acceleration limit map is generated based on a parameters related to at least one of the following: road curvature, road bank angle, and road slope.

6. The method of claim 1, further comprising the step of calculating a projected vehicle speed at the curve based on a current vehicle speed, a current vehicle longitudinal acceleration, and a current vehicle lateral acceleration; and comparing the speed profile with the projected vehicle speed.

7. The method of claim 6, further comprising the step of warning a driver of the vehicle if the projected vehicle speed exceeds the speed profile for at least a portion of the curve.

8. The method of claim 6, further comprising the step of decelerating the vehicle if the projected vehicle speed exceeds the speed profile for at least a portion of the curve.

9. The method of claim 6, further comprising the step of informing a driver of the vehicle if the projected vehicle speed is below the speed profile for at least a portion of the curve.

10. A curve speed estimation unit for a motor vehicle operative to:
receive inputs indicating a position of the vehicle relative to a curve of a road on which the vehicle is travelling;
receive inputs related to a velocity of the vehicle;
receive inputs related to geometry of the curve;
receive inputs related to surface conditions of the road;
receive inputs related to vehicle-specific data;
receive inputs related to driver preferences; and
use at least some of the above inputs to determine a speed profile for the curve by generating an acceleration limit map, the acceleration limit map depending on a relationship between a maximum possible longitudinal acceleration and a maximum possible lateral acceleration for traversing the curve.

11. The curve speed estimation unit of claim 10, wherein the inputs related to geometry of the curve comprise at least one of a radius of curvature, an angle of bank, and a road slope.

12. The curve speed estimation unit of claim 10, wherein the inputs related to vehicle-specific data comprise at least one of a vehicle type, a vehicle center-of-mass location, and a weight of the vehicle.

13. The curve speed estimation unit of claim 10, wherein the inputs related to surface conditions of the road comprise at least one of a surface friction, an outside temperature, and a road surface material.

14. The curve speed estimation unit of claim 10, wherein the inputs related to surface conditions of the road are received via wireless communication from at least one of a second vehicle and a surrounding infrastructure.

15. The curve speed estimation unit of claim 10, wherein the curve speed estimation unit further receives inputs related to a measured driving style.

16. The curve speed estimation unit of claim 10, wherein the inputs related to driver preferences comprise a selection by a driver of the vehicle of one of a comfort mode, an economy mode, and a performance mode.

17. A method of determining a speed profile for a road curve being approached by a vehicle comprising:
identifying physical characteristics of the road;
identifying vehicle-specific data related to an ability of the vehicle to negotiate the curve;
and determining the speed profile for the curve by generating an acceleration limit map, the map generated by considering a relationship between a maximum possible longitudinal acceleration and a maximum possible lateral acceleration for traversing the curve.

18. The method of claim 17 wherein the physical characteristics of the road comprise at least one of a radius of curvature, an angle of bank, and a road slope.

* * * * *

UNITED STATES PATENT AND TRADEMARK OFFICE
CERTIFICATE OF CORRECTION

PATENT NO. : 9,187,097 B2
APPLICATION NO. : 13/527165
DATED : November 17, 2015
INVENTOR(S) : Levin et al.

It is certified that error appears in the above-identified patent and that said Letters Patent is hereby corrected as shown below:

In the claims

Column 7, Line 15, Claim 5:

After "generated based on a"
Delete "parameters" and
Insert -- parameter --

Signed and Sealed this
Sixteenth Day of August, 2016

Michelle K. Lee
*Director of the United States Patent and Trademark Office*